(12) United States Patent
Walczak et al.

(10) Patent No.: US 6,289,853 B1
(45) Date of Patent: Sep. 18, 2001

(54) WATER INJECTION SYSTEM FOR AN INTERNAL COMBUSTION ENGINE OF A MARINE PROPULSION SYSTEM

(75) Inventors: Thomas J. Walczak, Oconomowoc; Stephen B. Riese, Fond du Lac, both of WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/567,399

(22) Filed: May 9, 2000

(51) Int. Cl.$^7$ .................................................. F02M 37/04
(52) U.S. Cl. .................................. 123/25 R; 123/25 C
(58) Field of Search .......................... 123/25 R, 25 C, 123/25 A

(56) References Cited

U.S. PATENT DOCUMENTS

| | | |
|---|---|---|
| 3,894,166 | 7/1975 | Brown et al. .................. 427/316 |
| 4,096,829 | 6/1978 | Spears ............................... 123/25 |
| 4,240,380 | 12/1980 | Slagle ............................... 123/25 |
| 4,300,483 | 11/1981 | Goodman .......................... 123/25 |
| 4,351,289 | 9/1982 | Renda ............................... 123/25 |
| 4,448,153 | 5/1984 | Miller ............................... 123/25 |
| 4,448,170 | 5/1984 | O'Hara ............................. 123/25 |
| 4,548,187 * | 10/1985 | Olsson et al. ................. 123/25 C |
| 4,640,234 * | 2/1987 | Olsson et al. ................. 123/25 C |
| 4,741,823 | 5/1988 | Olsen et al. ....................... 210/96 |
| 4,770,775 | 9/1988 | Lopez ............................... 210/321 |
| 4,805,571 * | 2/1989 | Humphrey ....................... 123/25 C |
| 4,846,970 | 7/1989 | Bertelsen et al. ............... 210/232 |
| 5,744,008 | 4/1998 | Craven ............................... 202/83 |
| 5,904,121 * | 5/1999 | Mezheritsky et al. .......... 123/25 C |
| 5,937,799 | 8/1999 | Binion ............................... 123/25 |
| 6,170,470 * | 1/2001 | Clarkson et al. ............... 123/25 C |

OTHER PUBLICATIONS

"A Pure Water Handbook", Osmonics, Inc.
"Better Solutions for Your Seawater", Osmonics, Inc.
"Proven Technology for Ocean Water Treatment", Osmonics, Inc.
PUR Watermarks by Recovery Engineering Inc.

* cited by examiner

Primary Examiner—Noah P. Kamen
Assistant Examiner—Jason Benton
(74) Attorney, Agent, or Firm—William D. Lanyi

(57) ABSTRACT

A marine propulsion system is provided with a pump, a filter, and a water injector for injecting a spray or mist of water into the charge air of an internal combustion engine. Water is drawn from a body of water in which a marine propulsion system is operated, in conjunction with a marine vessel, and the water is pumped through a filter before being injected into the charge air of the engine. The filter can be a reverse osmosis device. The engine can be a turbo-charged or normally aspirated engine. The water injection system is suitable for use in association with the 4-cycle or 2-cycle engines.

20 Claims, 4 Drawing Sheets

WATER INJECTION SYSTEM FOR AN INTERNAL COMBUSTION ENGINE OF A MARINE PROPULSION SYSTEM

BACKGROUND OF THE INVENTION

1. Field of the Invention

The present invention is generally related to a water injection system for an internal combustion engine and, more specifically, to a system for drawing water from a body of water in which a marine vessel is operated and conducting that water to at least one combustion chamber of an internal combustion engine that is used in the marine propulsion system of the marine vessel.

2. Description of the Prior Art

It is well known that certain advantages can be obtained in the operation of an internal combustion engine if water is injected either directly into a combustion chamber or into the air stream flowing toward the combustion chamber.

U.S. Pat. No. 5,937,799, which issued to Binion on Aug. 17, 1999, discloses a cylinder water injection engine. It is described as an environmentally accommodating, reduced NOx, spark or plasma ignited, reciprocating, multi-fuel engine utilizing direct, in-cylinder water injection and an optional oxygen enriched air supply. The engine is also described as being able to operate as an ultra-lean burn, high compression ratio engine for notable power output and increased efficiency. The in-cylinder low-temperature water injection promotes numerous desirable effects. For example, it significantly lowers compression temperatures through the latent heat of vaporization of the water, the lower temperature of compression permits increased compression ratios while avoiding pre-ignition, and the water injected air/fuel demands less work in the compression stroke. As a result, it increases overall engine efficiency. The system also promotes increased mass flow through the engine for increased power output and efficiency and, furthermore, it lowers the formation of nitrogen oxide emissions.

U.S. Pat. No. 4,448,153, which issued to Miller on May 15, 1984, describes a water injection system for a combustion engine. The engine is described as having an intake manifold and carburetor to which water is injected or sprayed by an electrically powered pump receiving water from a reservoir. Switches responsive to engine temperature, engine oil pressure, and engine intake manifold vacuum are used to determine whether the circuitry for energizing the pump will be opened or closed. A valve member that is responsive to the intake manifold vacuum serves to permit a greater rate of flow of the water to the engine upon the manifold vacuum decreasing to a predetermined magnitude.

U.S. Pat. No. 4,096,829, which issued to Spears on Jun. 27, 1978, describes a water injection system for an internal combustion engine. The liquid injection apparatus is used with an internal combustion engine which has an ignition system. It comprises a liquid pump and an electrical drive therefore. The pump has an outlet which communicates with the engine air intake. A control means includes a pulse rate frequency to analog converter to control electrical current flow to the drive in response to and as a function of electrical pulses produced by the ignition system. As a result, the flow of liquid of the engine air intake is a function of the pulse output of the ignition system.

U.S. Pat. No. 4,351,289, which issued to Renda on Sep. 28, 1982, describes a water injection system for an internal combustion engine. The water injection is carried out in a pressure system, with water from a reservoir pressurized by an injection pump energized only above predetermined torque demand levels and under a control of a vacuum switch sensing intake manifold pressure. The injection of water is also precluded until the engine reaches operating temperature by a vacuum switch connected to a PVS valve. A water spray nozzle is mounted in the air cleaner and directs droplets into the carburetor intake. A purging pump causes purging of a short section of the feed line upstream of the injection nozzle after the engine is shut off in order to minimize water drippage into the engine carburetor.

U.S. Pat. No. 4,300,483, which issued to Goodman on Nov. 17, 1981, describes an electronically controlled fluid injection system for an internal combustion engine. The system is intended for use with an internal combustion engine in which an injection nozzle injects a finely divided spray of fluid, such as water or a water solution, into the engine in response to a flow of atomizing air. The nozzle is connected to a fluid supply reservoir and to the outlet line of an air injection pump connected to the intake manifold of the engine and to an electronic circuit that includes an inductive pick-up coupled to the ignition system of the engine. The pump operates in response to engine speed by virtue of its connection to the ignition system and in response to engine load by virtue of its connection to the intake manifold. As a result, the flow of atomizing air to the nozzle and therefore the rate and magnitude of water injection is responsive to engine speed and engine load.

U.S. Pat. No. 4,448,179, which issued to O'Hara on May 15, 1984, describes a water injection system for an internal combustion engine. The system controls the amounts of water injected into the fuel intake to the cylinders in proportional response to the pressure in the engine's exhaust manifold. First conduit means, preferably including an extended surface heat sink and a length of flexible, plastic tubing, communicate the exhaust manifold pressure to the upper surface of a supply of water in an enclosed container. A lower part of the container is connected by second conduit means to a point in the fuel intake system, preferably in the air inlet to the carburetor. An adjustable throttling valve is interposed in the second conduit means for selective control of the relation of water flow to exhaust manifold pressure.

U.S. Pat. No. 4,240,380, which issued to Slagle on Dec. 23, 1980, describes a water injection system. Water is pumped from a holding tank through nozzle means to an area above the carburetion means on an internal combustion engine. The pumping means is controlled by diaphragm means reacting to intake manifold pressure as well as manual control. Filtering means are provided to allow the use of normal tap water. The diaphragm control means operates only after intake manifold pressure has risen to a certain point and ceases to operate after it has risen above a second point of pressure. In another version, a variable pump is used to provide water in direct relationship to the manifold pressure over the indicated or selected range. The nozzle and the carburetion means act together to provide proper atomization of the water in the fuel air mixture.

U.S. Pat. No. 3,894,166, which issued to Brown et al on Jul. 8, 1975, describes an integral reverse osmosis membrane with a highly pressed woven fabric support member. The integral cellulosic reverse osmosis membrane has a permeable fabric support and is made by a process which comprises casting a concentrated membrane-forming dope and forming a reverse osmosis membrane on a smooth surface of a permeable casting and membrane support fabric comprising substantially unsized continuous multiple warp and fill strands of fiber-forming crystalline organic thermoplastic resin, which fabric has been highly pressed at temperatures and pressures sufficient to smooth the surfaces of the fabric to a high degree of smoothness and sufficient to substantially completely close permanently the interstices at the strand intersections while leaving the pressed fabric permeable to the flow of a fluid such as desalinated water.

U.S. Pat. No. 4,770,775, which issued to Lopez on Sep. 13, 1988, describes an apparatus for the production of fresh water from sea water by reverse osmosis. The invention relates to an apparatus for the production of fresh water from seawater, intended to be immersed into the marine medium. The apparatus comprises one high pressure chamber containing a selective semi-permeable reverse osmosis membrane and a bell chamber having an internal axial piston permitting by a multiplier effect, to obtain at the interior of the chamber a pressure equal to the exterior pressure multiplied by a ratio S/s of the working surfaces of the bell chamber and the internal piston. The semi-permeable membrane communicates across a separation wall of the high pressure chamber with the interior volume of the bell chamber. This internal volume is placed in communication with the surface by a flexible tube in such a manner as to play the dual role of, on one hand, a subatmospheric gas chamber, and on the other hand means for receiving fresh water after osmosis across the membrane.

U.S. Pat. No. 4,846,970, which issued to Bertelsen et al on Jul. 11, 1989, describes a cross-flow filtration membrane test unit. A cross-flow filtration membrane test unit has a bottom cell body, a top cell body, and a pair of laterally spaced O-rings forming a seal therebetween. The bottom cell body is provided with a feed spacer cavity and the top cell body is provided with a permeate carrier cavity. A mechanism for receiving a test sample of membrane enables the membrane performance and characteristics to be tested in a manner which closely simulates actual full-scale operation.

U.S. Pat. No. 4,741,823, which issued to Olsen et al on May 3, 1988, describes a flow control manifold for cross-flow membrane systems. A cross-flow membrane system is described for separating feed water into a concentrate stream and a permeate stream which includes a cross-flow membrane module, a pump for pressurizing feed water for supply to the module and a flow control manifold block having a permeate, a concentrate bore, and a concentrate orifice for controlling the flow of concentrate from the system and the operating pressure within the cross-flow membrane module. The manifold block simplifies the manufacture, operation and maintenance of the system and allows an elimination of many of the tubes, hoses, and valves which are commonly required in prior art systems.

U.S. Pat. No. 5,744,008, which issued to Craven on Apr. 28, 1998, describes hurricane tower water desalination device. A simple, portable, and efficient water desalination device uses deep ocean water, solar energy, and the dynamics of generated secondary vortices to operate. The device includes a tower, a heat exchanger positioned inside the tower near the top of the tower, a cold water source, a cold water receiving tank, a condensate catchment grille, a freshwater collecting tank, a rotor extending upward between the side walls of the tower from a lower portion of the tower, a power source for driving the rotor, a warm salt water pan positioned in the bottom of the tower and a warm salt water source. The cold water source is cold deep ocean water that is siphoned to the top of the tower through rollable, transportable fabric pipes. The warm salt water source is solar heated ocean water. In the water, a hurricane is simulated by a rotating column that induces a circulation of air which approximates that of a hurricane. The rising warm vapor contacts the cold plate of the heat exchanger, condenses into droplets on the plate, and collects in a reservoir. That process is accomplished without consuming ocean water nutrients. Multiple desalination devices are placed on a barge to create a mobile vortex-principal desalination plant for military operations and other temporary or emergency applications.

The patents described above are hereby explicitly incorporated by reference in the description of the present invention.

A "Pure Water Handbook" which is published by Osmonics, Inc., describes the basic elements of water purification. It also discusses various types of impurity and methods of water purification. These methods include reverse osmosis, nanofiltration, and ultrafiltration. Water filtration systems are available in commercial quantities from the Osmonics Corporation which makes various types of desalination systems and components thereof. In addition, PUR water makers are available in commercial quantities from Recovery Engineering, Inc. and these systems are suitable for providing fresh water for use on marine vessels.

Although water injection has been used in conjunction with internal combustion engines to improve the operation of the internal combustion engines, all known systems have required the use of a reservoir in which clean water is contained and used for the purpose of injection into the combustion chamber of an engine or into the air stream flowing to the combustion chamber. The requirement of a water reservoir necessitates the refilling of the reservoir as the water is consumed for its intended purposes. This requirement of a water reservoir has severely limited the application of water injection systems for internal combustion engines.

Internal combustion engines used in marine propulsion systems are uniquely suited for water injection into the combustion chambers of internal combustion engines if the surrounding water, in which the marine vessel is operated, can be used for these purposes. Heretofore, the silt, sediment, salt, and other debris suspended in the body of water prohibited its use for these purposes. It would therefore be significantly beneficial if a means could be developed in which water can be drawn from a body of water in which a marine vessel operates and then used in a water injection system of the internal combustion engine.

SUMMARY OF THE INVENTION

A marine propulsion system made in accordance with the preferred embodiment of the present invention, comprises an internal combustion engine and a water injector for directing water into a combustion chamber of the internal combustion engine. It further comprises a pump for causing a stream of water to flow from a body of water in which the marine propulsion system is operated to the water injector.

The marine propulsion system can comprise an outboard motor, but can also be a sterndrive, inboard drive, or other type of marine propulsion system which is associated with an internal combustion engine.

The present invention preferably further comprises a water filter disposed in fluid communication between the pump and the water injector. The water filter can comprise a cross-flow membrane, such as a reverse osmosis membrane, for separating a permeate liquid from a concentrate liquid. The permeate liquid is conducted to the water injector and injected into either the combustion chamber or the air stream flowing to the combustion chamber and the concentrate liquid is conducted back to the body of water in which the marine propulsion system is operated.

The marine propulsion system is attached to a marine vessel or boat, to provide propulsion for the marine vessel in the body of water. It should be understood that the water injector can inject water directly into the combustion chamber of the internal combustion engine or, alternatively, the water injector can inject water into a flow of charge air flowing toward the combustion chamber.

The pump of the present invention can be external to the marine propulsion system and can be located within the marine vessel. Alternatively, the pump can be internal to the marine propulsion system and be contained within its structure.

A water inlet device can be connected in fluid communication with the pump to draw water from the body of water and provide that water to the pump which then pumps the water to the water filter. The water inlet device can be attached to the marine vessel which is propelled by the marine propulsion system or, alternatively, it can be an inlet opening of the marine propulsion system itself. One embodiment of the present invention further comprises an air compressor connected in fluid communication with an air inlet of the internal combustion engine for the purpose of increasing the flow of air into the internal combustion engine. The body of water from which the water is drawn for injection into the combustion chamber can be a fresh water body of water, such as an inland lake, or it can be a salt water body of water, such as an ocean.

It should be understood that the internal combustion engine of the present invention can be a 2-cycle engine or a 4-cycle engine and can comprise any suitable number of cylinders and combustion chambers. The present invention is applicable for use with any internal combustion engine in which air and fuel are combined in an air/fuel mixture and conducted into a combustion chamber for ignition within a cylinder of the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
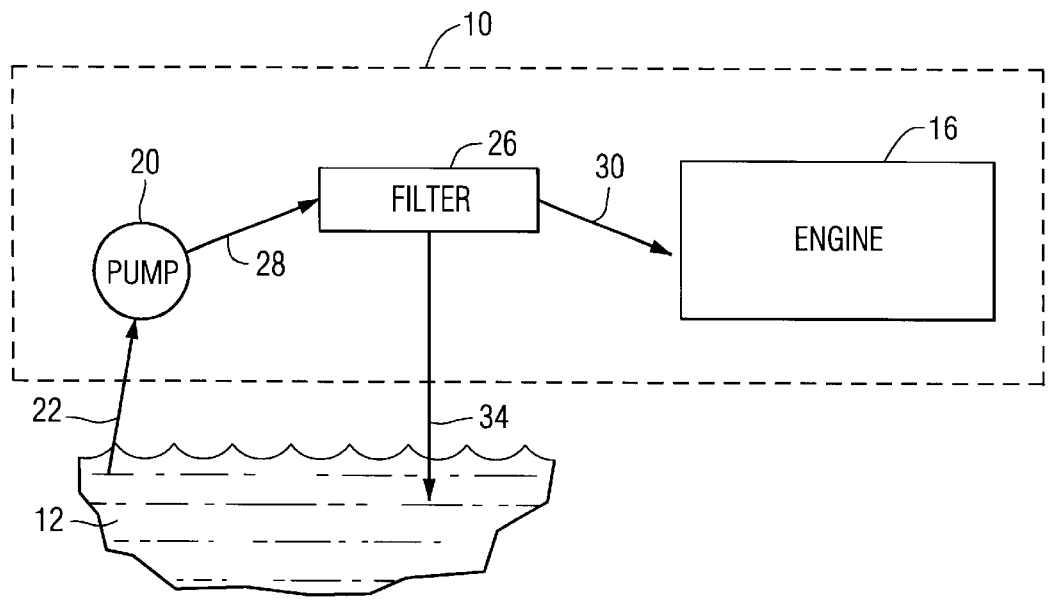
FIG. 1 is a highly schematic representation of the present invention.

Throughout the description of the preferred embodiment of the present invention, like components will be identified by like reference numerals.

The present invention makes possible an arrangement on a marine vessel such as that illustrated schematic in FIG. 1. The dashed box represents a marine vessel 10, or boat, on which a marine propulsion system is used to propel the boat on a body of water 12. An engine 16, such as an internal combustion engine, is operatively associated with a drive unit for the purpose of rotating a propeller or impeller to create thrust which propels the marine vessel 10 relative to the body of water 12. Although the propeller and marine drive unit is not specifically illustrated in FIG. 1, many different types of marine propulsion systems are well known to those skilled in the art. These include outboard motors, inboard drives, and sterndrive units.

A pump 20 draws water from the body of water 12, as represented by arrow 22, and pumps the water to a filter 26, as represented by arrow 28. The filter separates pure water from suspended elements and the permeate or filtered water, is conducted to the engine 16 as represented by arrow 30. The concentrate, from which the permeate is separated by the filter 26, is returned to the body of water 12 as represented by arrow 34. The internal combustion engine 16 can be a 2-cycle or 4-cycle engine and can comprise any number of cylinders. The permeate provided by the filter 26 can be injected directly into combustion chambers of the cylinders of the engine 16 or, alternatively, can be injected into the air stream flowing through an intake manifold system toward the combustion chambers of the engine. The body of water 12 provides an inexhaustible supply of water for injection into the engine 16 and the filter 26 assures that the water drawn from the body of water 12 is of sufficient purity to be injected into the engine 16 without fouling the components of the engine. The filter 26 not only removes various suspended minerals, silt, and debris from the water, but can also be used to desalinate the water if the marine vessel is operated in a body of salt water, such as an ocean. By providing the filter 26, the present invention assures that the injection of water into the air stream of the engine will not be harmful to the components of the engine. Otherwise, small orifices could possibly be clogged by silt and suspended materials and significant corrosion could occur as a result of the ingestion of salt water into the water injected components of the engine.

Figure 2:
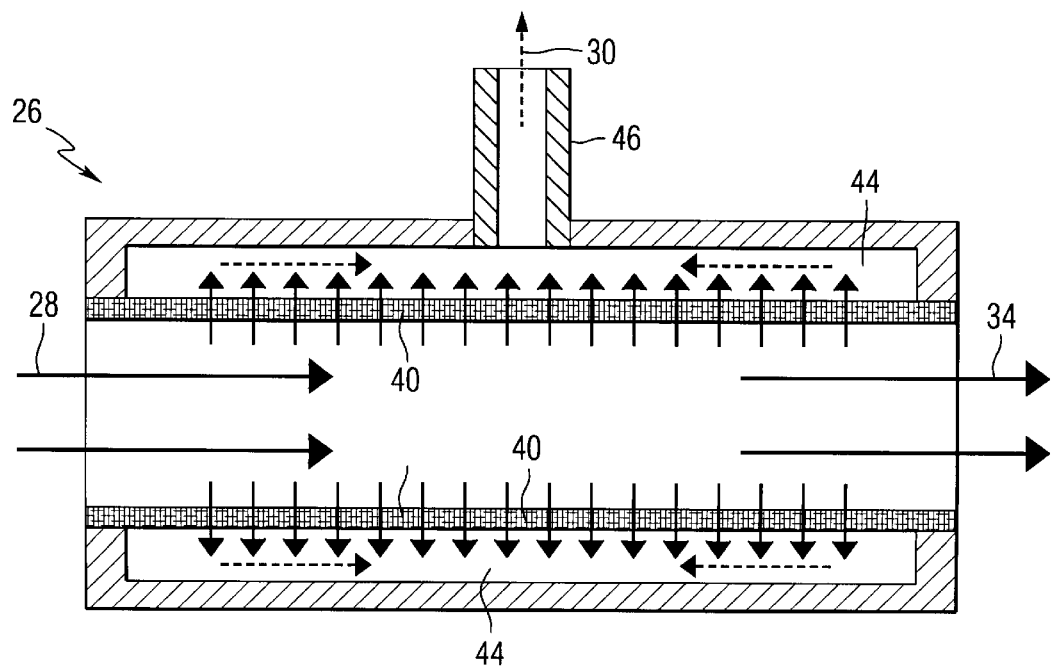
FIG. 2 is a section view showing the internal structure of a water filter suitable for use with the present invention.

FIG. 2 shows a simplified section view of a filter which can be used in a preferred embodiment of the present invention. Water is pumped into the filter 26 by the pump 20, as described above in conjunction with FIG. 1, and as represented by arrows 28 in FIG. 2. The permeate portion of the water stream flows through a reverse osmosis membrane 40, as represented by the plurality of arrows flowing from the central chamber of the filter 26 into a surrounding permeate chamber 44. From the permeate chamber 44, the permeate flows through a permeate conduit 46, as represented by arrow 30. This water is then conducted to injectors associated with the engine. The portion of the incoming water represented by arrows 28 which does not pass through the reverse osmosis membrane 40 continues to flow out of the filter 26 as concentrate represented by arrows 34.

Figure 3:
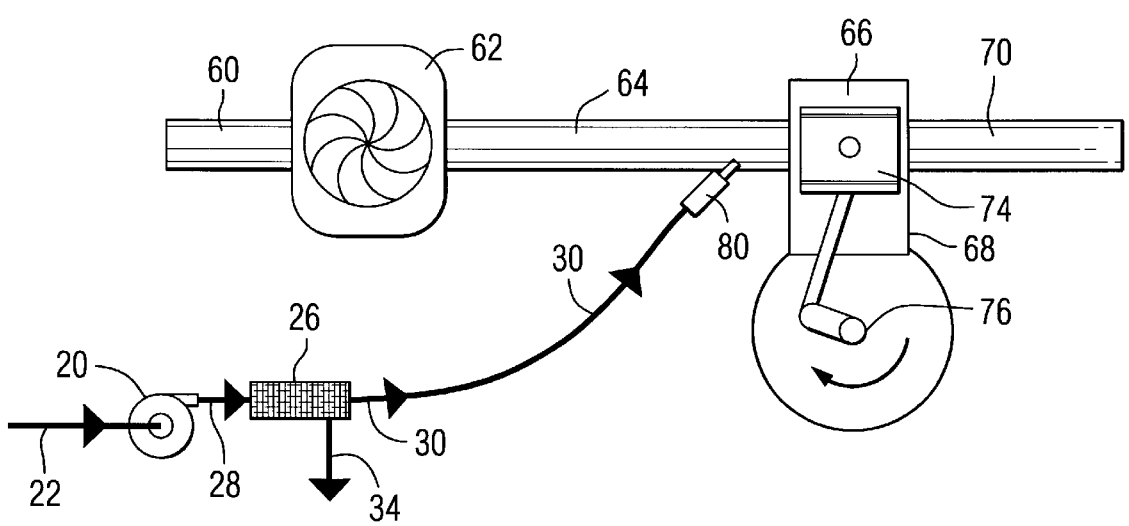
FIG. 3 is a schematic illustration of the present invention incorporated with a turbo-charged engine.

FIG. 3 is a schematic representation of a supercharged engine incorporating the present invention. Air is drawn through a conduit 60, such as an intake manifold, by a compressor 62 which provides a pressurized stream of air in conduit 64 to the combustion chamber 66 of a cylinder 68 of the engine 16, described above in conjunction with FIG. 1. Following ignition of the fuel/air mixture in the combustion chamber 66, exhaust gas is expelled through an exhaust conduit 70. Within the cylinder 68, in a manner well known to those skilled in the art, a piston 74 reciprocates to drive a crankshaft 76 which is operatively connected to a propeller shaft of the marine vessel in order to propel the marine vessel relative to the body of water 12 described above in conjunction with FIG. 1.

A water injector 80 injects water into the air stream flowing between the compressor 62 and the combustion chamber 66. Permeate flow is provided to the injector 80, as represented by arrow 30, from the filter 26. The pump 20 draws from the body of water, as indicated by arrow 22 and provides that pressurized water to the filter 26, as represented by arrow 28. Concentrate is returned to the body of water as represented by arrow 34 in FIGS. 1 and 3. In the manner shown in FIG. 3, clean water is provided to the water injector 80 and this permeate fluid is injected into the charge air stream as it flows from the compressor 62 to the combustion chamber 66. Although illustrated in the manner shown in FIG. 3, it should be understood that the present invention could alternatively inject water vapor or spray directly into the combustion chamber 66 in alternative embodiments of the present invention. The precise method or location of the water injection into the fuel/air mixture is not limiting to the present invention.

Figure 4:
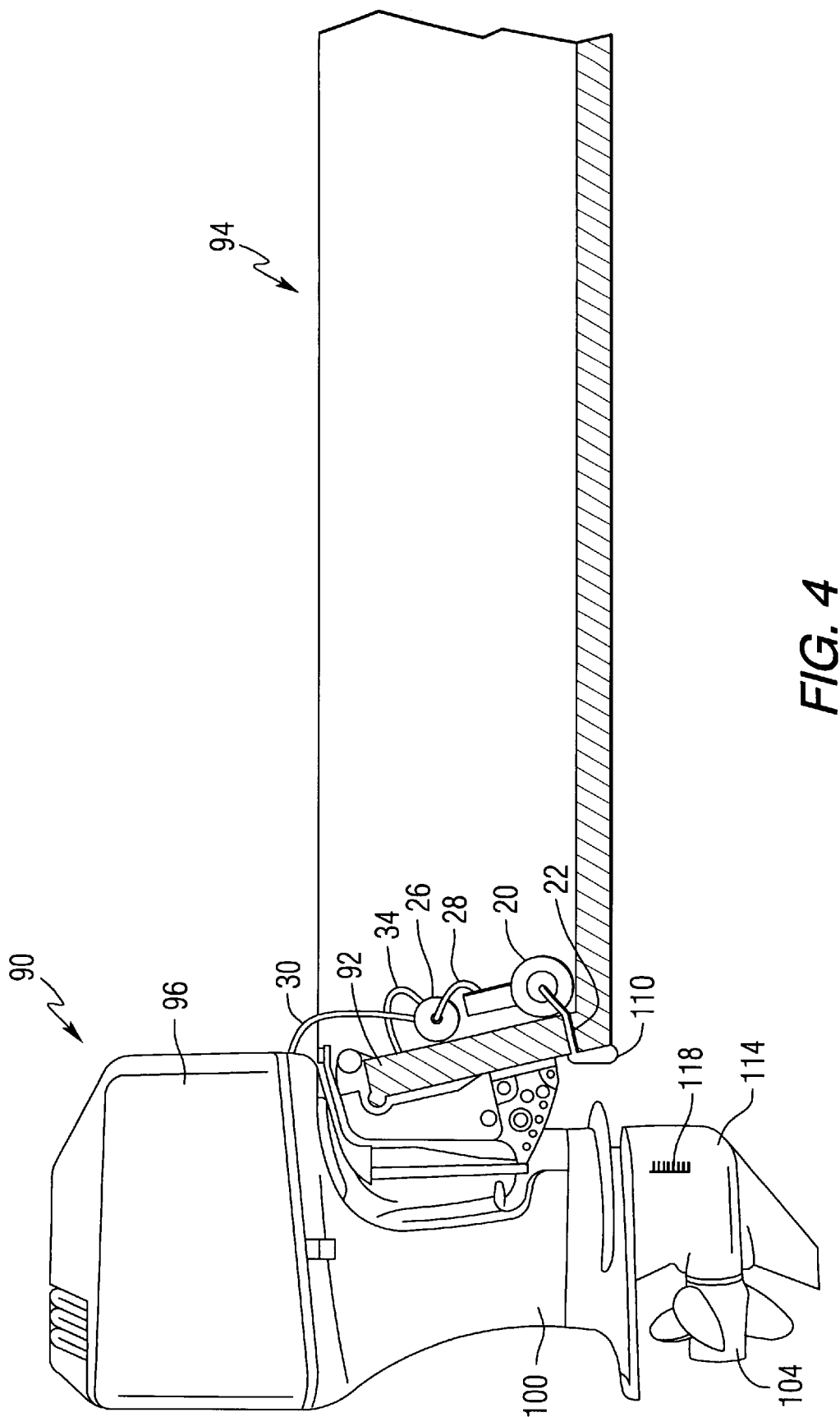
FIG. 4 shows a marine vessel with an outboard motor equipped with the present invention.

FIG. 4 shows an outboard motor 90 attached to the transom 92 of a marine vessel 94. As is well known to those skilled in the art, an internal combustion engine 16, as described above in conjunction with FIG. 1, is located under the cowl 96 of the outboard motor 90. Its vertical crankshaft extends downward from the engine, through the driveshaft housing 100, to a set of gears that translates torque from the vertical driveshaft to a horizontal propeller shaft that is attached to a propeller 104. Rotation of the crankshaft of the engine causes the propeller 104 to rotate and provide propulsion for the marine vessel 94. In FIG. 4, the high pressure pump 20 is located near the transom 92 of the marine vessel 94 and connected in fluid communication with the filter 26. The filter 26 separates the permeate from the concentrate and directs the permeate through a conduit 30 to the water injectors of the cowl under the cowl 96. The concentrate, on the other hand, is directed through conduit 34 and is returned to the body of water in which the marine vessel 94 is operating. A water intake, or water inlet device 110, is shown attached to the bottom portion of the marine vessel 94 to receive water from the body of water and conduct that water through conduit 22 to the high pressure pump 20.

Although the embodiment shown in FIG. 4 illustrates that pump 20 is located within the marine vessel 94 external to the marine propulsion system, or outboard motor 90, it should be understood that the pump 20 could be contained within the gear case housing 114 or driveshaft housing 100 of the outboard motor 90 or, alternatively, under the cowl 96. Furthermore, although a water inlet 110 is shown attached to the marine vessel 94 external to the outboard motor 90, it should be understood that the water inlet 118 in the lower gear case 114 of the outboard motor 90 could be used to draw water from the body of water in association with the pump 20 which, in this particular alternative embodiment, would be located within either the gear case housing 114 or driveshaft housing 100 or, alternatively, under the cowl 96.

Figure 5:
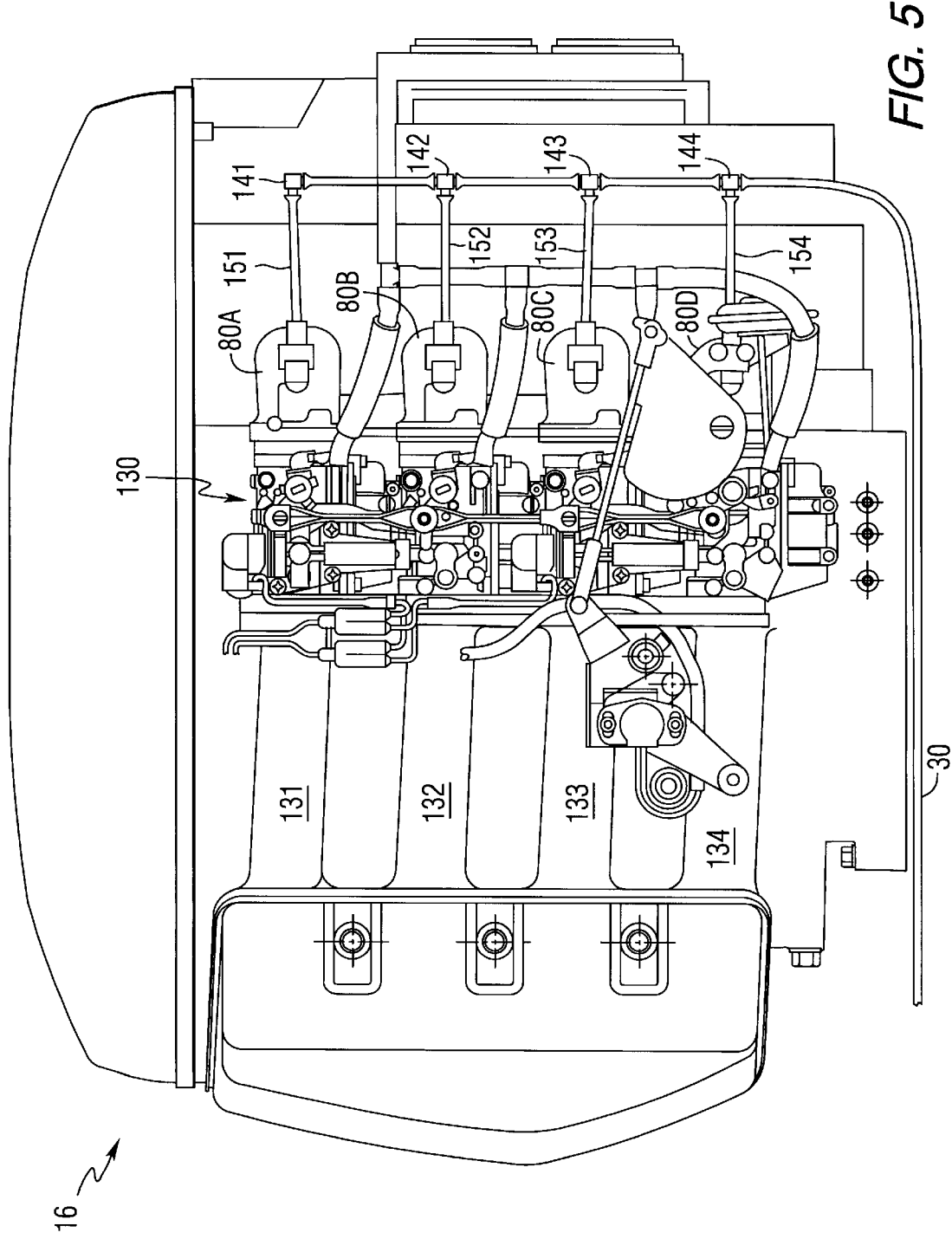
FIG. 5 shows a side view of an engine of an outboard motor provided with appropriate conduits and water injectors to perform the functions of the present invention.

FIG. 5 shows an internal combustion engine 16 such as that which could be located under the cowl 96 of the outboard motor 90 shown in FIG. 4 and described above. Permeate liquid would be conducted through conduit 30 toward the combustion chambers of the engine 16. A plurality of carburetors 130 are aligned in a vertical row in FIG. 5 and each of the four carburetors is associated with an air intake conduit 131–134. Air flows through the air intake conduits toward the carburetors 130 where the air is mixed with fuel to form a fuel/air mixture as it flows toward the combustion chambers of the engine 16. Water injectors 80A–80D are associated with the carburetors to inject a spray or mist of water into the fuel/air mixture as it flows from the carburetors 130 toward the combustion chambers of the engine. The permeate liquid is conducted by conduit 30 toward a series of nodes, 141–144, which distribute the permeate liquid to each of the water injectors, 80A–80D, through individual conduits, 151–154.

Although FIG. 5 shows a 4-cycle engine that comprises four cylinders, it should be understood that the particular type of engine is not limiting to the present invention. The present invention can be used on either 2-cycle or 4-cycle engines and with any applicable number of cylinders and combustion chambers.

As is known to those skilled in the art, the induction of a hot charge of air into either a supercharged, turbo-charged, or normally aspirated internal combustion engine can create performance problems with the engine. Pre-detonation of the incoming charge, elevated ignition levels of nitrogen oxides, and other combustion inefficiencies are all detrimental to the ideal performance of the engine. These problems that occur in internal combustion engine are sometimes limiting factors on how much boost the intake charge can have, how high the compression ratio can be, how lean the fuel/air ratio of the charge can be, and how advanced the ignition timing can be. Limitations to the boost, the fuel/air ratio, the compression ratio, and the ignition timing can limit the efficiency of the engine. As the temperature of the intake air charge increases, the limitations to these performance factors also increase.

The concept of injecting water spray or vapor into the charge air of an internal combustion engine is not, in itself, a new concept. This is evident from the numerous United States patents described above. This concept has been used since the 1940's on aircraft and there are many such systems described in patents, including those described above and others. In addition, certain "after-market" water injection kits are available for automotive applications. These systems require a water reservoir to be used in which clean water is provided for these purposes.

Prior to the present invention, induction water injection has not been used in a marine propulsion system application. Although water has been injected into the exhaust systems of marine propulsion engines, no water injection systems into the intake charge are known to be used in conjunction with marine propulsion systems. The most significant benefits achievable with water injection systems are related to turbo-charged and supercharged engines.

Water injection systems can benefit both 4-cycle and 2-cycle engines. Most large 2-cycle outboard engines typically operate at a compression ratio that is significantly less than the compression ratio in 4-cycle engines. It is well known that the inlet air charge temperature entering an engine is a sensitive parameter for knock problems. It is also well known that by the nature of the scavenging process of a 2-cycle engine, only a percentage of the hot exhaust gas from the previous cycle is actually purged from the combustion chamber for the subsequent cycle. The result is that as much as a third of the trapped charge for the subsequent cycle is actually a hot exhaust gas. This can create a charge within the combustion chamber of 500 degrees F. As a result, 2-cycle engines require a lower compression ratio. If the 2-cycle engine's tendency to incur knock problems could be reduced to that of a 4-cycle engine, the fuel efficiency and power would increase substantially. It is known that water injection, with its high latent heat of vaporization, can effectively cool an incoming air charge. However, introducing water into the intake manifold, or crankcase, or transfer port of a 2-cycle engine would create problems concerning the washing of the lubrication from the cylinder bores and also would create problems relating to corrosion of internal engine components such as crankshafts, bearings, bores and other elements of the engine. Therefore, in a 2-cycle engine, the water would ideally be introduced directly into the cylinder and its combustion chamber so as not to impinge on the cylinder walls. A preferred embodiment of the present invention used in conjunction with a 2-cycle engine could use a pneumatic fuel injector through which both fuel and water are injected into the combustion chamber. As a result, nitrogen oxide formation, which is strongly dependent on the combustion temperature within the cylinder, could be significantly reduced.

The combination of a filter 26 with the pump 20 allows a water injection system to be efficiently provided for a marine propulsion system in which the storage of pure water in a reservoir is no longer necessary because the marine propulsion system naturally operates within a body of water. In previous systems, water injection systems required the use of distilled water for injection into the engine's intake charge. The purity of the water for reliability and for performance of the system. Highly pure water reduces the potential for fouling of the water rejection apparatus and for buildup of deposits in the combustion chamber. The requirement for highly pure water in a water injection system in the past required the use of distilled water that is stored in a reservoir. The distilled water would have to be replenished frequently because the reservoir volume is limited and the engine constantly uses water as it is injected into the combustion chambers. The present invention uses a cross-flow membrane filtration system, such as a reverse osmosis system. This type of system requires relatively high inlet pressures because it filters fresh and salt water on a molecular basis. This system purifies all water to a purity level similar to that of distilled water. This also means that the water will be suitable for intake water injection into the engine. As a result, an unlimited supply of usable water can be provided by drawing water from the body of water in which the marine vessel operates and filtering it with a system of this type. The basic concept of this type of system uses a modified cross-flow membrane filtration system such as reverse osmosis, nanofiltration, ultrafiltration, or other methods, in conjunction with a marine propulsion system application such as an outboard motor. The system drives water from the body of water in which the marine vessel is operated and the water is pumped by a high pressure pump to a filter. As the water goes through a media filter, large particles are filtered from the flow. The coarsely filtered water then is pumped into a membrane canister in which the incoming water is delivered to the center of the membrane. Under the high pressure, some of the water molecules are able to pass through the membrane. This water is known as the permeate because it has permeated the membrane. The water which does not pass through the membrane is referred to as the concentrate because it has a higher concentration of contaminants rejected by the membrane. The water referred to as the concentrate flows out through the membrane canister and is returned to the body of water in which the marine vessel is operated. The purified water, or permeate, exits the membrane canister and is fed into the water injection system. Since this permeate liquid has been filtered on a molecular basis, it is suitable for use with the water injection system. The filtration system is able to supply the water injection system with an unlimited supply of purified water.

Although described with particular detail and illustrated to show one particularly preferred embodiment of the present invention, it should be understood that alternative embodiments are also within its scope.

We claim:

1. A marine propulsion system, comprising:
   an internal combustion engine;
   a water injector for directing water into a combustion chamber of said internal combustion engine; and
   a pump for causing a stream of water to flow from a body of water in which said marine propulsion system is operated to said water injector.
2. The marine propulsion system of claim 1, wherein:
   said marine propulsion system comprises an outboard motor.
3. The marine propulsion system of claim 1, further comprising:
   a water filter disposed in fluid communication between said pump and said water injector.
4. The marine propulsion system of claim 3, wherein:
   said water filter comprises a cross flow membrane for separating a permeate liquid from a concentrate liquid.
5. The marine propulsion system of claim 4, wherein:
   said permeate liquid is conducted to said water injector.
6. The marine propulsion system of claim 5, wherein:
   said concentrate liquid is conducted back to said body of water.
7. The marine propulsion system of claim 1, wherein:
   said water injector injects water directly into said combustion chamber of said internal combustion engine.
8. The marine propulsion system of claim 1, wherein:
   said water injector injects water into a flow of charge air flowing toward said combustion chamber.
9. The marine propulsion system of claim 1, wherein:
   said pump is external to said marine propulsion system.
10. The marine propulsion system of claim 9, further comprising:
    a water inlet device connected in fluid communication with said pump.
11. The marine propulsion system of claim 10, wherein:
    said water inlet device is attached to a boat which is propelled by said marine propulsion system.
12. The marine propulsion system of claim 1, further comprising:
    an air compressor connected in fluid communication with an air inlet of said internal combustion engine for increasing the flow of air into said internal combustion engine.
13. The marine propulsion system of claim 3, wherein:
    said water filter comprises a reverse osmosis membrane for separating a permeate liquid from a concentrate liquid.
14. A marine propulsion system, comprising:
    an internal combustion engine;
    a water injector for directing water into a combustion chamber of said internal combustion engine;
    a pump for causing a stream of water to flow from a body of water in which said marine propulsion system is operated to said water injector; and
    a water filter disposed in fluid communication between said pump and said water injector.
15. The marine propulsion system of claim 14, wherein:
    said water filter comprises a cross flow membrane for separating a permeate liquid from a concentrate liquid.
16. The marine propulsion system of claim 15, wherein:
    said cross flow membrane is a reverse osmosis membrane;
    said permeate liquid is conducted to said water injector; and
    said concentrate liquid is conducted back to said body of water.
17. The marine propulsion system of claim 16, wherein:
    said water injector injects water into a flow of charge air flowing toward said combustion chamber.
18. The marine propulsion system of claim 17, wherein:
    said pump is external to said marine propulsion system.
19. A method for operating a marine propulsion system, comprising the steps of:
    providing an internal combustion engine;
    pumping a stream of water from a body of water in which said marine propulsion system is operated; and
    injecting said stream of water into a combustion chamber of said internal combustion engine.
20. The method of claim 19, further comprising the step of;
    filter said stream of water between said pumping and injecting steps.

* * * * *